(12) United States Patent
Gorton et al.

(10) Patent No.: US 12,182,996 B2
(45) Date of Patent: Dec. 31, 2024

(54) SYSTEMS AND METHODS TO PROCESS ELECTRONIC IMAGES TO IDENTIFY ATTRIBUTES

(71) Applicant: PAIGE.AI, Inc., New York, NY (US)

(72) Inventors: Danielle Gorton, Beacon, NY (US); Matthew Hanna, New York, NY (US); Christopher Kanan, Pittsford, NY (US)

(73) Assignee: Paige.AI, Inc., New York, NY (US)

( * ) Notice: Subject to any disclaimer, the term of this patent is extended or adjusted under 35 U.S.C. 154(b) by 364 days.

(21) Appl. No.: 17/591,640

(22) Filed: Feb. 3, 2022

(65) Prior Publication Data

US 2022/0351368 A1    Nov. 3, 2022

Related U.S. Application Data

(60) Provisional application No. 63/183,290, filed on May 3, 2021.

(51) Int. Cl.
*G06T 7/00* (2017.01)

(52) U.S. Cl.
CPC .. *G06T 7/0012* (2013.01); *G06T 2207/10056* (2013.01); *G06T 2207/30024* (2013.01)

(58) Field of Classification Search
CPC ......... G06T 7/0012; G06T 2207/10056; G06T 2207/30024; G06V 10/462; G06V 20/698
See application file for complete search history.

(56) References Cited

U.S. PATENT DOCUMENTS

| | | | |
|---|---|---|---|
| 2012/0014578 A1* | 1/2012 | Karssemeijer | G06T 7/0012 382/131 |
| 2019/0304409 A1* | 10/2019 | Takayama | G02B 21/367 |
| 2020/0294231 A1* | 9/2020 | Tosun | G06V 20/69 |
| 2022/0076411 A1* | 3/2022 | Georgescu | G06V 10/764 |
| 2022/0351368 A1* | 11/2022 | Gorton | G06V 10/462 |

FOREIGN PATENT DOCUMENTS

WO    2020243556 A1    12/2020

* cited by examiner

*Primary Examiner* — Md K Talukder
(74) *Attorney, Agent, or Firm* — Bookoff McAndrews, PLLC

(57) ABSTRACT

A computer-implemented method may identify attributes of electronic images and display the attributes. The method may include receiving one or more electronic medical images associated with a pathology specimen, determining a plurality of salient regions within the one or more electronic medical images, determining a predetermined order of the plurality of salient regions, and automatically panning, using a display, across the one or more salient regions according to the predetermined order.

19 Claims, 11 Drawing Sheets

SYSTEMS AND METHODS TO PROCESS ELECTRONIC IMAGES TO IDENTIFY ATTRIBUTES

RELATED APPLICATION(S)

This application claims priority to U.S. Provisional Application No. 63/183,290 filed May 3, 2021, the entire disclosure of which is hereby incorporated herein by reference in its entirety.

FIELD OF THE DISCLOSURE

Various embodiments of the present disclosure pertain generally to image processing methods. More specifically, particular embodiments of the present disclosure relate to systems and methods for identifying attributes of electronic images.

BACKGROUND

Under existing processes, pathologists need to manually search slides for salient information to fill out a report of their findings. The process is time consuming, and may lead to pathologist fatigue and eye strain.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the present disclosure, systems and methods are disclosed for identifying attributes of electronic images and displaying the attributes.

A method for identifying attributes of electronic images and displaying the attributes may include receiving one or more electronic medical images associated with a pathology specimen, determining a plurality of salient regions within the one or more electronic medical images, determining a predetermined order of the plurality of salient regions, and automatically panning, using a display, across the one or more salient regions according to the predetermined order.

The method may include detecting tissue within the one or more electronic medical images. The plurality of salient regions may include at least a portion of the detected tissue. Detecting the tissue may include removing a background. Removing the background may include thresholding a plurality of local regions within the one or more electronic medical images based on a variance of each local region among the plurality of local regions to determine which local regions among the plurality of local regions do not contain tissue.

The predetermined order may be determined according to a policy. The predetermined order may be determined according to at least one of a tissue type, a tissue texture, a calcification presence or level, an inflammation presence or level, a salient region size, a salient region shape, a salient region location, a disease type, a color, a stain type, a tissue texture, a biomarker type, a genetic signature, a protein type, or one or more blood markers.

The method may include determining a magnification level of each salient region of the plurality of salient regions. The automatically panning using the display may be further according to the determined magnification level of each salient region. Determining the magnification level of each salient region may be based on a policy.

The one or more electronic medical images may include a first electronic medical image. The plurality of salient regions may include a first salient region in the first electronic medical image and a second salient region. The second salient region may be after the first salient region according to the predetermined order.

The method may include determining whether the second salient region is in the first electronic medical image. If it is determined that the second salient region is also in the first electronic medical image, automatically panning using the display may include panning across the first salient region to the second salient region in the first electronic medical image. If it is determined that the second salient region is not in the first electronic medical image, the method may include determining that the second salient region is in a second electronic medical image, and automatically panning using the display may include panning across the first salient region in the first electronic medical image, jumping to the second electronic medical image, and panning across the second salient region.

The one or more electronic medical images may include a first electronic medical image. The plurality of salient regions may include a first salient region in the first electronic medical image and a second salient region. The second salient region may be after the first salient region according to the predetermined order.

The method may include determining whether the second salient region is also in the first electronic medical image. If it is determined that the second salient region is also in the first electronic medical image, the method may include determining whether a first salient region is a predetermined distance or more from the second region. If it is determined that the first salient region is the predetermined distance or more from the second region, the automatically panning using the display may include panning across the first salient region, jumping to the second salient region, and panning across the second salient region.

The method may include determining whether a pause command has been received. If it is determined that a pause command has been received, the method may include pausing automatic panning of the display. If it is determined that a pause command has not been received, the method may include continuing automatic panning of the display.

The method may include determining whether an annotation has been received. If it is determined that an annotation has been received, the method may include automatically panning the display in accordance with the annotation. If it is determined that an annotation has not been received, the method may include continuing to automatically pan the display.

The method may include determining the predetermined order based on a received annotation or policy. The received annotation or policy may have been received prior to automatically panning.

During automatically panning, the method may include receiving at least one of an annotation or a policy and modifying the predetermined order based on the received annotation or policy. The one or more electronic medical images may be whole slide images obtained using a microscope.

A system for identifying attributes of electronic images and displaying the attributes may include at least one memory storing instructions and at least one processor configured to execute the instructions to perform operations. The operations may include receiving one or more electronic medical images associated with a pathology specimen, determining a plurality of salient regions within the one or more electronic medical images, determining a predetermined order of the plurality of salient regions, and automatically panning, using a display, across the one or more salient regions according to the predetermined order.

The operations may further include determining a magnification level of each salient region of the plurality of salient regions. The automatically panning using the display may be further according to the determined magnification level of each salient region. Upon receiving an annotation or a policy, the processor may be configured to modify the instructions.

A non-transitory computer-readable medium may store instructions that, when executed by a processor, perform a method for identifying attributes of electronic images and displaying the attributes. The method may include receiving one or more electronic medical images associated with a pathology specimen, determining a plurality of salient regions within the one or more electronic medical images, determining a predetermined order of the plurality of salient regions, and automatically panning, using a display, across the one or more salient regions according to the predetermined order.

It is to be understood that both the foregoing description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1A:
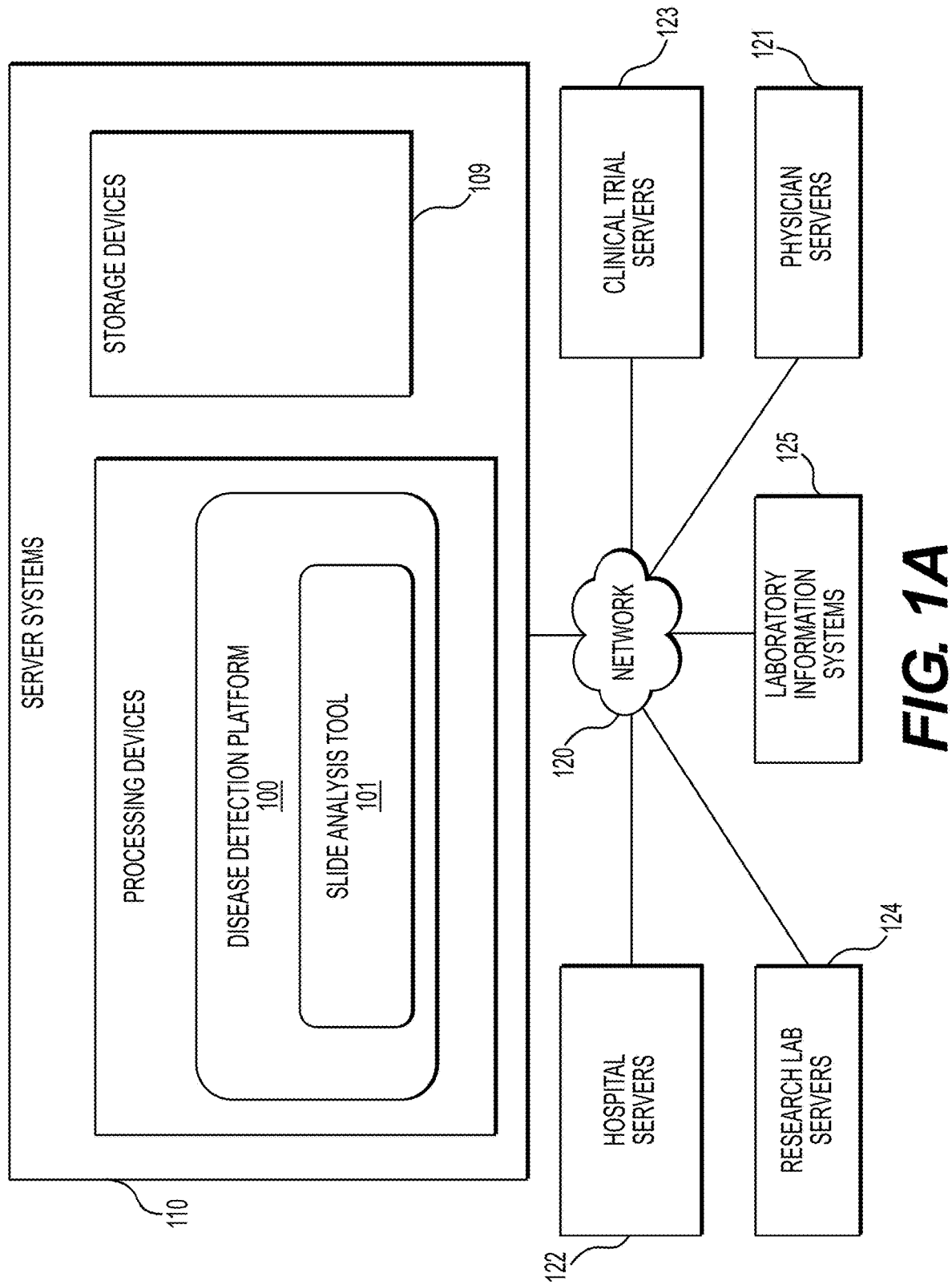
FIG. 1A illustrates an exemplary block diagram of a system and network to identify salient attributes of digital or electronic slide images and to follow a policy or strategy of smoothly displaying (via zooming, panning, etc.) the identified salient attributes, according to an exemplary embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

Until recently, pathologists have used traditional microscopy to review glass slides for the presence or absence of clinical or other features needed to conduct research or diagnose a tissue specimen. These applications range from determining if a drug has acceptable toxicity levels in a research animal, determining if a human has cancer, and/or determining if a human has inflammatory bowel disease, etc. However, there are many inefficiencies with this traditional workflow. One of the important issues is storage and retrieval of glass slides. Digital pathology may now address this problem, with slides being scanned at high magnification levels and then being immediately retrieved from electronic storage and viewed on a monitor.

Although digital pathology may address the storage and retrieval problem, there may be other issues. Existing digital pathology slide/case review platforms attempt to replicate the experience for pathologists when they use traditional microscopes with tools such as pan and zoom. The word "pan" may be used to describe a visual movement of a field of view between two regions of one or more images. "Zoom" may be used to describe a change in magnification level of a field of view of the slide. These digital versions of panning and zooming are not well matched to the microscope experience and therefore the pathologist may be slower than they are when using a microscope. In addition, many pathologists report arm and wrist fatigue due to the physical action of moving the mouse in order to pan and zoom across large areas tissue and reviewing many cases each day, where a case may consist of over 100 whole slide images (WSIs). All or multiple slides within the case should be reviewed by the pathologist to ensure the diagnosis is correct because features important for determining the correct diagnosis may be small and isolated to a single slide.

Figure 2:
FIG. 2 illustrates an example prostate needle core biopsy with multiple cores, according to an example embodiment.

Frequent slide panning and zooming may be necessary because slides may have significant regions that do not contain any tissue, so the tissue on a specific slide may be separated by significant amounts of "white space" (see FIG. 2). Moreover, when multiple slides belong to a case, the patient may need to jump among multiple slides to do a proper assessment.

A potential solution to these problems may be to use artificial intelligence (AI) to automatically determine the presence or absence of clinical features so that they may be immediately shown to a pathologist. The present disclosure describes policies (e.g., schemes) for presenting the AI's evidence for these attributes to the pathologist automatically, which helps pathologists verify the AI's findings without the necessity of using a mouse and/or other input devices and interfaces.

However, this might not optimize the pathologist's time because they may have to traverse multiple AI outputs, which still results in significant amounts of panning and zooming across one or more slides. Techniques presented herein relating to "tissue hop" may address the above problems by using tissue and disease-specific policies (e.g., strategies) to automatically traverse the findings determined by an AI system. The system may smoothly pan or "jump" from one location to the next in an appropriate way given the tissue type, findings determined by the AI, and/or the objectives of the user. For example, when reviewing a breast cancer tissue specimen, pathologists typically first identify all of the calcifications throughout the collection of slides. Techniques presented herein may enable the pathologist to first jump to the appropriate slide with calcifications and cancer, and then smoothly traverse the findings identified on the slide with minimal use of the mouse or other input devices, resulting in less fatigue. Beyond breast cancer, techniques presented herein may enable slides with the most severe finding to be reviewed first, and then the evidence on the slide determined by the AI to support that finding may be smoothly panned and zoomed across the specimen, and this "tour" of all of the slides in the case may even span multiple slides.

Figure 1B:
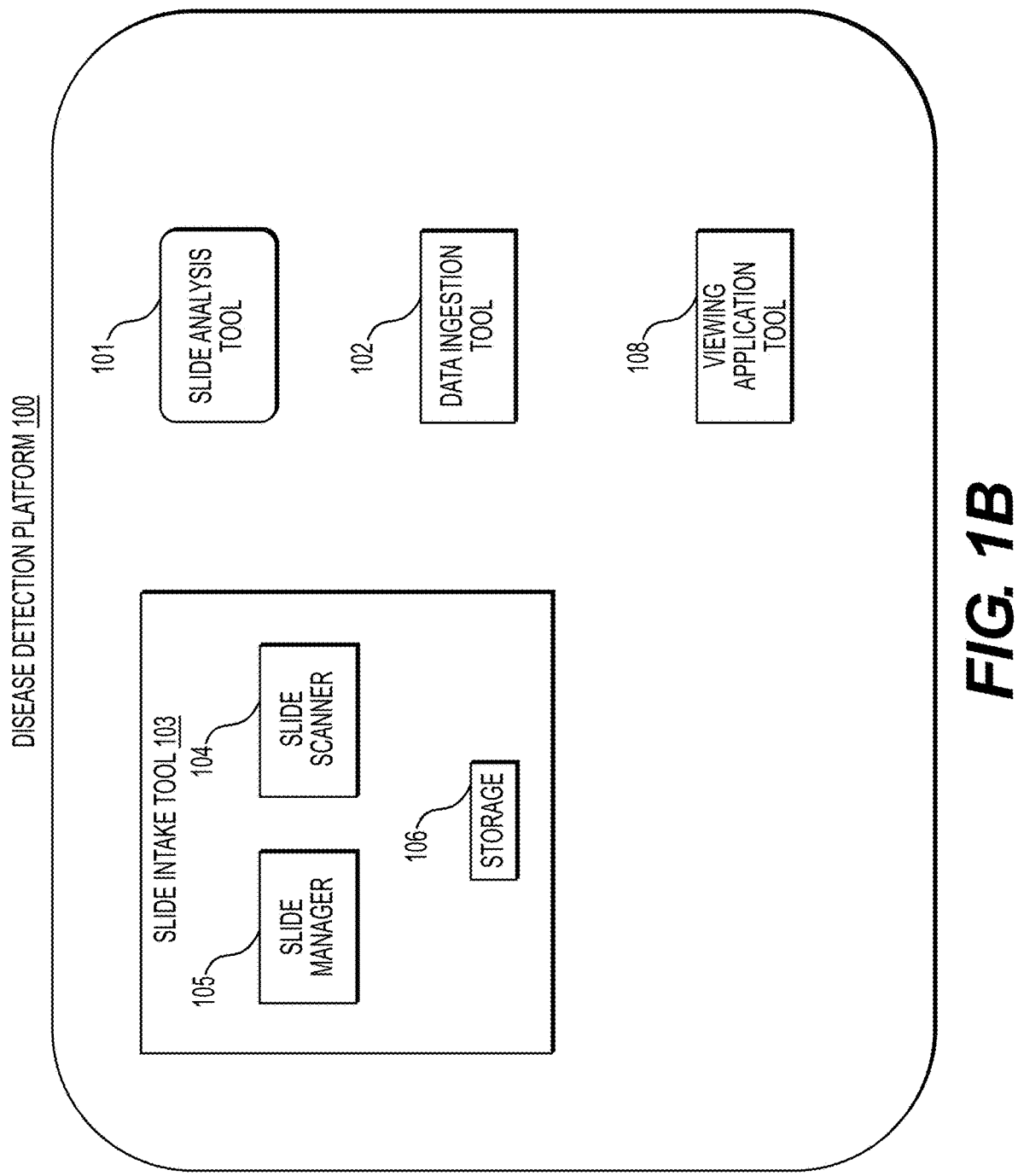
FIG. 1B illustrates an exemplary block diagram of a disease detection platform, according to an exemplary embodiment of the present disclosure.
Figure 1C:
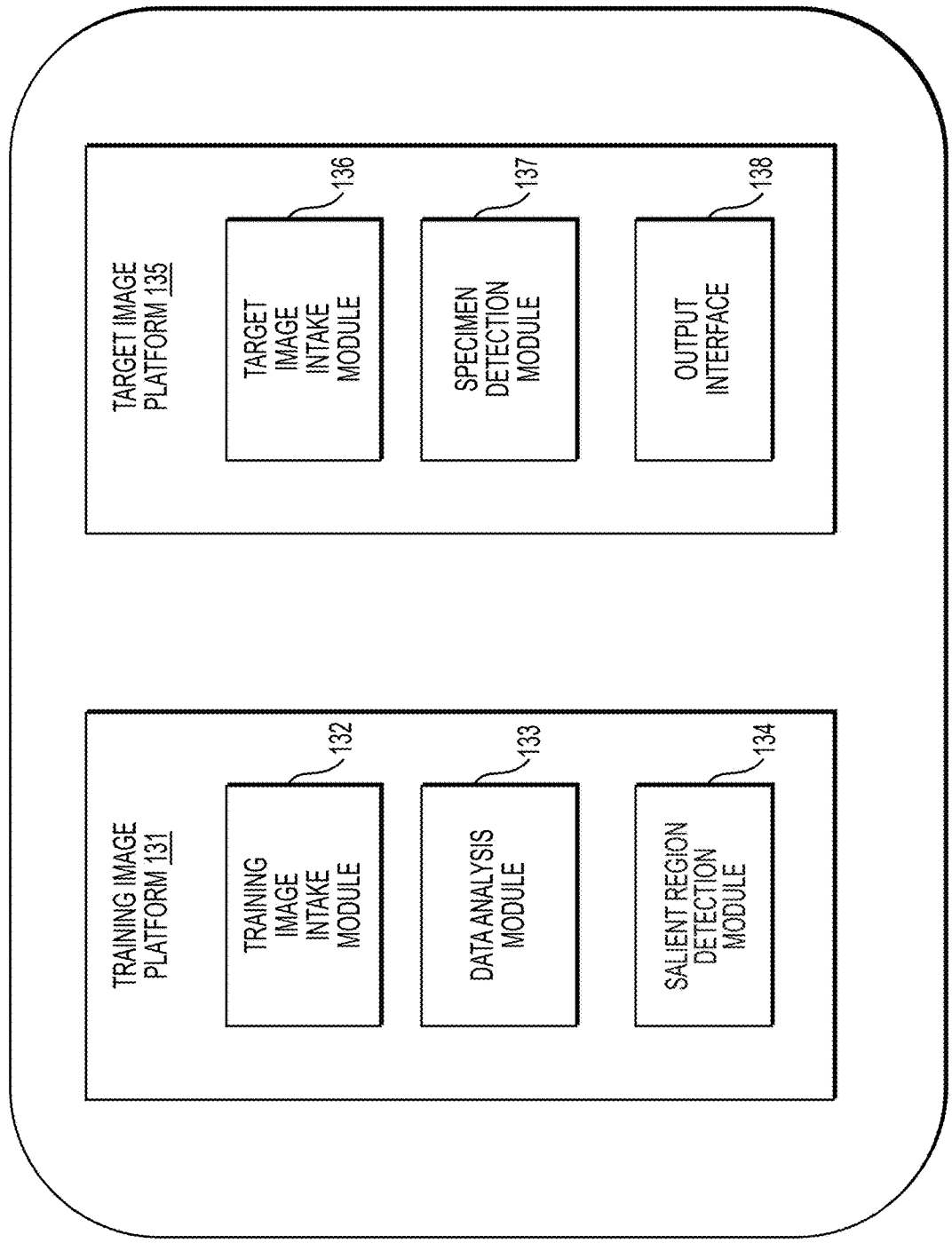
FIG. 1C illustrates an exemplary block diagram of a slide analysis tool, according to an exemplary embodiment of the present disclosure.

FIGS. 1A through 1C show a system and network to identify salient attributes of digital slide images and to follow a policy or strategy of smoothly displaying (via zooming, panning, etc.) the identified salient attributes, according to an exemplary embodiment of the present disclosure.

Specifically, FIG. 1A illustrates an electronic network 120 that may be connected to servers at hospitals, laboratories, and/or doctor's offices, etc. For example, physician servers 121, hospital servers 122, clinical trial servers 123, research lab servers 124, and/or laboratory information systems 125, etc., may each be connected to an electronic network 120, such as the Internet, through one or more computers, servers and/or handheld mobile devices. According to an exemplary embodiment of the present application, the electronic network 120 may also be connected to server systems 110, which may include processing devices that are configured to implement a disease detection platform 100, which includes a slide analysis tool 101 for determining specimen property or image property information pertaining to digital pathology image(s), and using machine learning to determine whether a disease or infectious agent is present, according to an exemplary embodiment of the present disclosure. The slide analysis tool 101 may allow for rapid evaluation of 'adequacy' in liquid-based tumor preparations, facilitate the diagnosis of liquid based tumor preparations (cytology, hematology/hematopathology), and predict molecular findings most likely to be found in various tumors detected by liquid-based preparations.

The physician servers 121, hospital servers 122, clinical trial servers 123, research lab servers 124 and/or laboratory information systems 125 may create or otherwise obtain images of one or more patients' cytology specimen(s), histopathology specimen(s), slide(s) of the cytology specimen(s), digitized images of the slide(s) of the histopathology specimen(s), or any combination thereof. The physician servers 121, hospital servers 122, clinical trial servers 123, research lab servers 124 and/or laboratory information systems 125 may also obtain any combination of patient-specific information, such as age, medical history, cancer treatment history, family history, past biopsy or cytology information, etc. The physician servers 121, hospital servers 122, clinical trial servers 123, research lab servers 124 and/or laboratory information systems 125 may transmit digitized slide images and/or patient-specific information to server systems 110 over the electronic network 120. Server system(s) 110 may include one or more storage devices 109 for storing images and data received from at least one of the physician servers 121, hospital servers 122, clinical trial servers 123, research lab servers 124, and/or laboratory information systems 125. Server systems 110 may also include processing devices for processing images and data stored in the storage devices 109. Server systems 110 may further include one or more machine learning tool(s) or capabilities. For example, the processing devices may include a machine learning tool for a disease detection platform 100, according to one embodiment. Alternatively or in addition, the present disclosure (or portions of the system and methods of the present disclosure) may be performed on a local processing device (e.g., a laptop).

The physician servers 121, hospital servers 122, clinical trial servers 123, research lab servers 124 and/or laboratory information systems 125 refer to systems used by pathologists for reviewing the images of the slides. In hospital settings, tissue type information may be stored in a laboratory information system 125.

FIG. 1B illustrates an exemplary block diagram of a disease detection platform 100 for determining specimen property or image property information pertaining to digital pathology image(s), using machine learning. The disease detection platform 100 may include a slide analysis tool 101, a data ingestion tool 102, a slide intake tool 103, a slide scanner 104, a slide manager 105, a storage 106, a laboratory information system 107, and a viewing application tool 108.

The slide analysis tool 101, as described below, refers to a process and system for determining data variable property or health variable property information pertaining to digital pathology image(s). Machine learning may be used to classify an image, according to an exemplary embodiment. The slide analysis tool 101 may also predict future relationships, as described in the embodiments below.

The data ingestion tool 102 may facilitate a transfer of the digital pathology images to the various tools, modules, components, and devices that are used for classifying and processing the digital pathology images, according to an exemplary embodiment.

The slide intake tool 103 may scan pathology images and convert them into a digital form, according to an exemplary embodiment. The slides may be scanned with slide scanner 104, and the slide manager 105 may process the images on the slides into digitized pathology images and store the digitized images in storage 106.

The viewing application tool 108 may provide a user with a specimen property or image property information pertaining to digital pathology image(s), according to an exemplary embodiment. The information may be provided through various output interfaces (e.g., a screen, a monitor, a storage device and/or a web browser, etc.).

The slide analysis tool 101, and one or more of its components, may transmit and/or receive digitized slide images and/or patient information to server systems 110, physician servers 121, hospital servers 122, clinical trial servers 123, research lab servers 124, and/or laboratory information systems 125 over a network 120. Further, server systems 110 may include storage devices for storing images and data received from at least one of the slide analysis tool 101, the data ingestion tool 102, the slide intake tool 103, the slide scanner 104, the slide manager 105, and viewing application tool 108. Server systems 110 may also include processing devices for processing images and data stored in the storage devices. Server systems 110 may further include one or more machine learning tool(s) or capabilities, e.g., due to the processing devices. Alternatively, or in addition, the present disclosure (or portions of the system and methods of the present disclosure) may be performed on a local processing device (e.g., a laptop).

Any of the above devices, tools, and modules may be located on a device that may be connected to an electronic network such as the Internet or a cloud service provider, through one or more computers, servers and/or handheld mobile devices.

FIG. 1C illustrates an exemplary block diagram of a slide analysis tool 101, according to an exemplary embodiment of the present disclosure. The slide analysis tool 101 may include a training image platform 131 and/or a target image platform 135.

According to one embodiment, the training image platform 131 may include a training image intake module 132, a data analysis module 133, and a cell identification module 134.

The training data platform 131, according to one embodiment, may create or receive training images that are used to train a machine learning model to effectively analyze and classify digital pathology images. For example, the training images may be received from any one or any combination of the server systems 110, physician servers 121, hospital servers 122, clinical trial servers 123, research lab servers 124, and/or laboratory information systems 125. Images used for training may come from real sources (e.g., humans, animals, etc.) or may come from synthetic sources (e.g., graphics rendering engines, 3D models, etc.). Examples of digital pathology images may include (a) digitized slides stained with a variety of stains, such as (but not limited to) H&E, Hematoxylin alone, IHC, molecular pathology, etc.; and/or (b) digitized tissue samples from a 3D imaging device, such as microCT.

The training image intake module 132 may create or receive a dataset comprising one or more training datasets corresponding to one or more health variables and/or one or more data variables. For example, the training datasets may be received from any one or any combination of the server systems 110, physician servers 121, hospital servers 122, clinical trial servers 123, research lab servers 124, and/or laboratory information systems 125. This dataset may be kept on a digital storage device. The data analysis module 133 may identify whether an area belongs to a region of interest or salient region, or to a background of a digitized image. The salient region detection module 134 may analyze digitized images and determine whether a region in the sample needs further analysis. The identification of such may trigger an alert to a user.

According to one embodiment, the target image platform 135 may include a target image intake module 136, a specimen detection module 137, and an output interface 138. The target image platform 135 may receive a target image and apply the machine learning model to the received target image to determine a characteristic of a target data set. For example, the target data may be received from any one or any combination of the server systems 110, physician servers 121, hospital servers 122, clinical trial servers 123, research lab servers 124, and/or laboratory information systems 125. The target image intake module 136 may receive a target dataset corresponding to a target health variable or a data variable. Specimen detection module 137 may apply the machine learning model to the target dataset to determine a characteristic of the target health variable or a data variable. For example, the specimen detection module 137 may detect a trend of the target relationship. The specimen detection module 137 may also apply the machine learning model to the target dataset to determine a quality score for the target dataset. Further, the specimen detection module 137 may apply the machine learning model to the target images to determine whether a target element is present in a determined relationship.

The output interface 138 may be used to output information about the target data and the determined relationship (e.g., to a screen, monitor, storage device, web browser, etc.). The output interface 138 may display identified salient regions of analyzed slides according to a policy or strategy (e.g., by zooming, panning, and/or jumping) to navigate the slides. The final result or output on the output interface 138 may appear as an automated, customized video or "tour" of the slides.

FIG. 2 depicts an example prostate needle core biopsy 200 with multiple cores 201, 202, and 203, according to an example embodiment. Note the large amount of white space between cores 201, 202, and 203. Manually panning across the slide involves zooming out, panning to the next location, and then zooming back in. Techniques presented herein may address this problem by automatically moving the field of view appropriately without requiring continual input from a user.

Techniques presented herein may solve the inefficient diagnostic review time shown by pathologists reviewing digital slides compared to glass slide review. By automatically navigating the tissue in descending order of potential areas of suspicion or priority, the pathologist is immediately played a tissue pathway navigating the slides. Current methodology predominantly has pathologists reviewing tissue by starting at one corner of a slide and reviewing all tissue on the slide in a serpentine fashion to the other diagonal corner. This novel methodology includes obviating the pathologist requirement of searching for the diagnostic areas of interest and presents those areas in descending order of interest to the pathologist. The order of priority of salient regions may be determined by salient region size, calcification presence and/or level, color, stain type or color, tissue texture, tissue type, biomarker type, DNA, protein type, blood markers, salient region shape, location, inflammation level, and/or combination thereof. Priority may further be determined by a predetermined confidence threshold in the salient region area, disease severity, disease stage, associated disease type, disease mortality, and/or combination thereof. The order of priority of salient regions may be determined automatically, by algorithm or artificial intelligence, by user-determined policy, and/or by the user.

No other tools for automating navigation of tissue in whole slide images currently exist. The closest method to embodiments presented herein may relate to "unintelligibly"

moving from one piece of tissue on a slide to another by manually and consequently clicking a button to move to the next piece of tissue.

Figure 3:
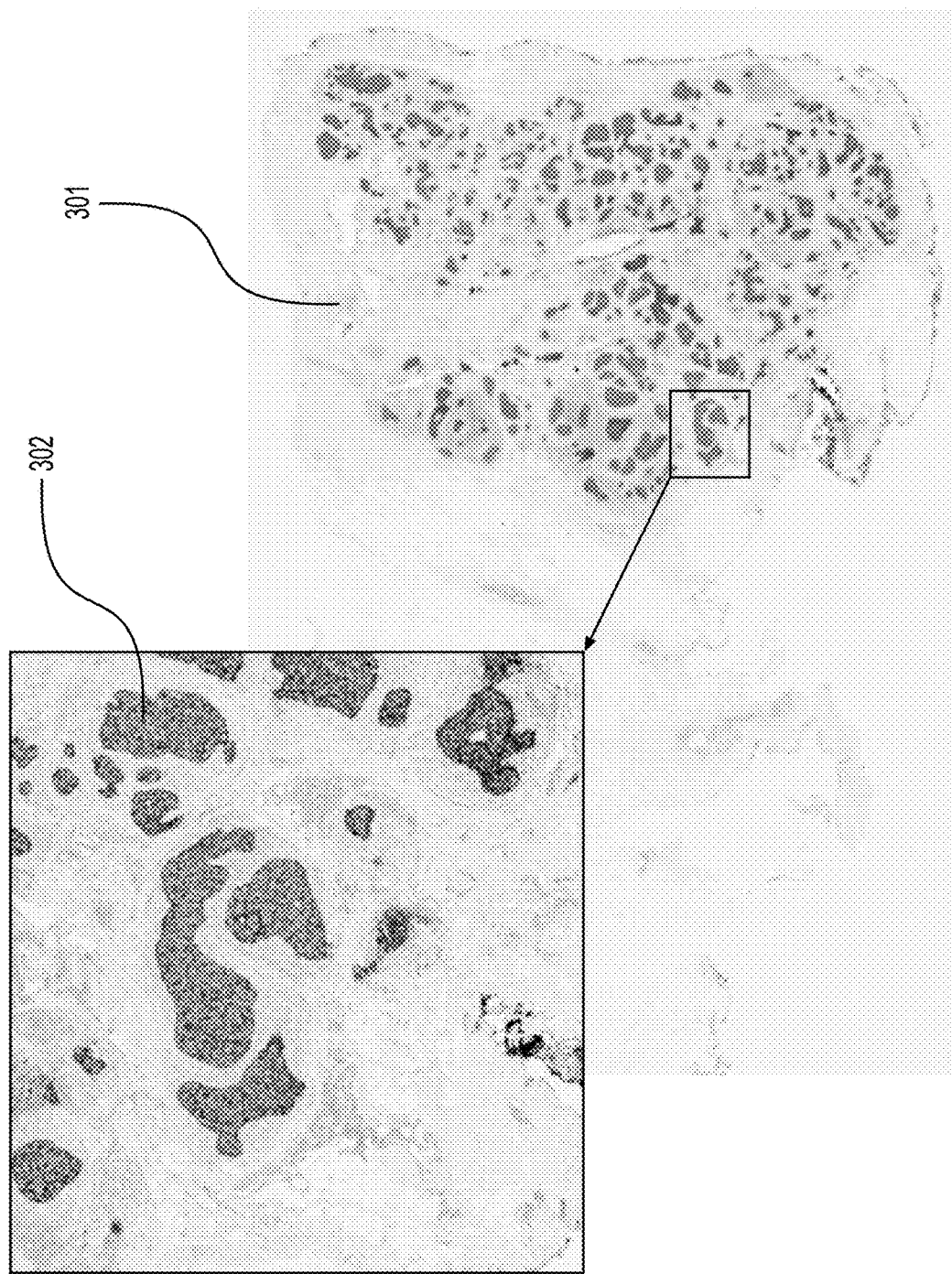
FIG. 3 illustrates an example of an exemplary slide of a sample having a salient region.

A salient region may comprise a region of interest within an image of a sample. The salient region may comprise some or all of the tissue sample, and may be automatically or manually determined. The salient region may comprise a biomarker, cancerous region, histological feature, etc., beyond a predetermined threshold. A region may be determined to be salient based upon a feature of interest such as feature size, calcification presence and/or level, color, stain type or color, tissue texture, tissue type, biomarker type, genetic signature, protein type, blood markers, tissue location, inflammation level, and/or combination thereof. A salient region may further be determined by a predetermined confidence that a feature of interest is present, including predicted disease severity, disease stage, associated disease type, disease mortality, and/or combination thereof. FIG. 3 depicts an exemplary slide containing an IHC stain of a sample 301 having a salient region 302. The system may predict, based on this image, biomarkers (e.g., HER2 biomarkers). Here, the system correctly classified the slide as HER2+.

Determining salient regions and/or their locations may be done using a variety of methods, including but not restricted to, running a machine learning model on image sub-regions to generate a prediction for each sub-region, and/or using machine learning visualization tools to create a detailed heatmap. A detailed heatmap may be created by using class activation maps, GradCAM, etc. Machine learning visualization tools may then be used to extract relevant regions and/or location information. Further details on determining salient regions are found in U.S. application Ser. No. 17/016, 048, filed Sep. 9, 2020, and Ser. No. 17/313,617, filed May 6, 2021, the entire contents of which are incorporated herein by reference.

Figure 4:
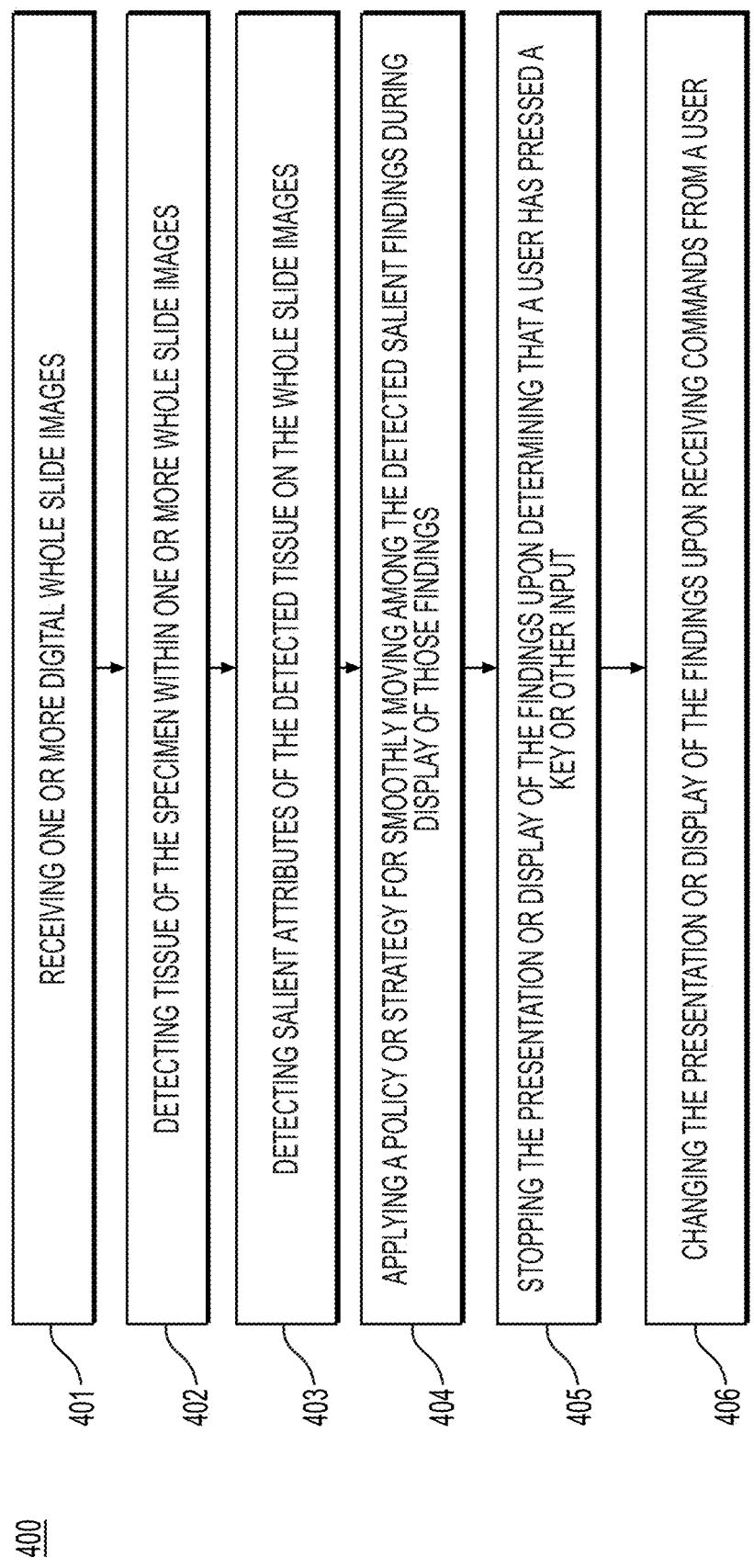
FIG. 4 is a flowchart illustrating an exemplary method for displaying salient attributes according to a strategy or policy, according to an example embodiment.

FIG. 4 is a flowchart of an exemplary method of displaying salient findings. An exemplary method 400 may be performed by, e.g., the slide analysis tool 101 and/or the target image platform 135, but embodiments disclosed herein are not limited.

The method 400 may include, in step 401, receiving one or more digital whole slide images (WSIs) for at least a part of a specimen. The WSI may be received into electronic storage.

In step 402, the method 400 may include detecting tissue of the specimen within one or more WSIs. This step may include using a method (e.g., Otsu's method) to remove background from a thumbnail, threshold local regions within the WSI based on their variance to determine which do not have tissue, etc.

In step 403, the method 400 may include detecting or identifying salient attributes of the detected tissue on the WSI. This detection may be performed or assisted using AI or, alternatively or in addition thereto, manual annotations (e.g., by a user). Any AI may be performed with an already existing system (e.g., slide analysis tool 101 and/or salient region detection module 134).

In step 404, the method 400 may include following or applying a policy or strategy for smoothly moving (e.g., panning and zooming) among the detected salient findings during display of those findings (e.g., via output interface 138). The policy or strategy may include appropriate or prescribed magnification levels based on the findings. The findings may be presented based on a descending order or priority determined by the policy or the user.

This display or presentation, according to the policy or strategy, may present evidence to a user for an appropriate diagnosis of the tissue. Without using AI or manual annotations, the presentation may pan across all or multiple tissue areas. The presentation (i.e., presentation or priority order, tissue hop, and magnification level of the findings) may be stored and/or recorded for replay.

In step 405, during presenting or panning, the method 400 may include stopping or pausing the presentation or display upon determining that a user has pressed a key or other input, e.g., a mouse stick or button, a joystick, or a keyboard button.

In step 406, the method 400 may include receiving commands, comments, or annotations, and changing the presentation (e.g., priority order, magnification level, and/or tissue hop of the findings) based on the received commands. For example, a user may interact with a section of the tissue during hands-off or automatic panning of the tissue to comment or otherwise annotate. The user may change the presentation (e.g., presentation or priority order, magnification level, and/or tissue hop) by adding an annotation or rejecting an area that the AI system has identified or highlighted.

The method 400 may omit one or more of these steps 401-406. For example, steps 405 and/or 406 may be omitted if a user does not wish to stop or modify the presentation. As another example, step 402 may be omitted, or alternatively, step 403 may be omitted.

Example Embodiment: Reviewing a Collection of Slides in an Educational Setting

Figure 5:
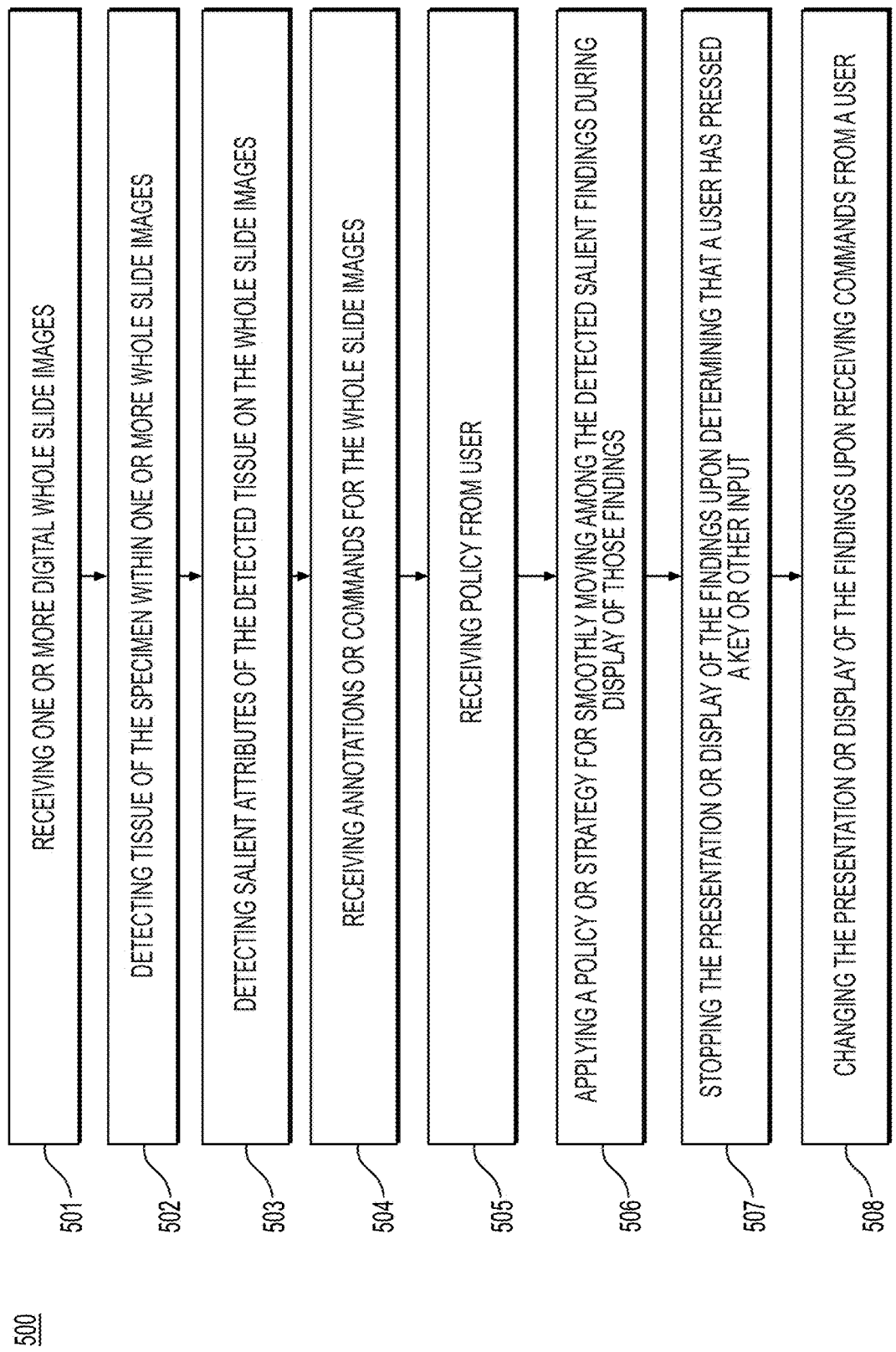
FIG. 5 is a flowchart illustrating an exemplary method for displaying salient attributes in an educational setting, according to an example embodiment.

FIG. 5 is a flowchart illustrating an exemplary method for displaying salient attributes in an educational setting, according to an example embodiment.

Digital pathology has many applications for education. Retrieval and annotation of digital slides is made far easier by digital pathology. Embodiments may be used to aid in teaching or demonstrating findings and areas of interest to others. The teacher may create areas of interest on the slide, determine the preferred zoom level to view them at, and/or create the policy for panning across these regions; thus, creating a demonstrable walk through a slide or a collection of slides to teach or otherwise educate (i.e., in a conference setting or other presentation such as a tumor board).

An exemplary method 500 may be performed by, e.g., the slide analysis tool 101 and/or the target image platform 135, but embodiments disclosed herein are not limited.

The method 500 may include steps similar to steps 401-403, and also steps 404-406 of the exemplary method 400 described with reference to FIG. 4. The method 500 may differ from the method 400 by further including receiving commands from a user and also the policy from the user before applying the policy.

The method 500 may include, in step 501, receiving one or more digital whole slide images (WSIs) for at least a part of a specimen. The WSI may be received into electronic storage.

In step 502, the method 500 may include detecting tissue of the specimen within one or more WSIs. This step may include using a method (e.g., Otsu's method) to remove background from a thumbnail, threshold local regions within the WSI based on their variance to determine which do not have tissue, etc.

In step 503, the method 500 may optionally include detecting or identifying salient attributes of the detected tissue on the WSI. This detection may be performed or assisted using AI or, alternatively or in addition thereto, manual annotations (e.g., by a user). Any AI may be performed with an already existing system (e.g., slide analysis tool 101 and/or salient region detection module 134).

After step 502, or optionally step 503, the method 500 may further include, in step 504, receiving annotations or commands for the WSIs. Here, the annotations may have been created by and received from an educator. However, this exemplary method 500 may be similarly applied to other settings, such as the physician/hospital setting.

The method may include, in step 505, receiving the policy from the educator for navigating or presenting the whole slide images based on the annotations. In this case where the policy is received directly from the educator, the method may optionally exclude step 504 receiving annotations. Alternatively, in the case where the method includes step 504 receiving annotations, this step 505 may include modifying a pre-stored or predetermined policy according to the received annotations.

The method 500 may continue to step 506, similar to previously described step 304, of applying the policy, where the applied policy here is the policy received (or alternatively, modified) in step 502. In step 506, the policy or strategy may be applied or followed for smoothly moving (e.g., panning and zooming) among the detected salient findings during display of those findings (e.g., via output interface 138). The policy or strategy may include appropriate or prescribed magnification levels based on the findings. The findings may be presented based on a descending order or priority determined by the policy or the user (e.g., educator). This display or presentation, according to the policy or strategy, may present evidence to a user for an appropriate diagnosis of the tissue. Without using AI or manual annotations, the presentation may pan across all or multiple tissue areas. The presentation (i.e., presentation or priority order, magnification level, and/or tissue hop of the findings) may be stored and/or recorded for replay.

The method 500 may also include step 507 of stopping or pausing the presentation upon determining that a user (e.g., educator) has pressed a key or other input (e.g., a mouse stick or button, a joystick, or a keyboard button.)

The method may include step 508 of changing the presentation based on any further received commands from the user (e.g., educator). In step 508, a user (e.g., educator) may interact with a section of the tissue during hands-off or automatic panning of the tissue to comment or otherwise annotate. The user may change the presentation (e.g., presentation or priority order, magnification level, and/or tissue hop) by adding an annotation or rejecting an area that the AI system has identified or highlighted. As with the exemplary method 400, one or more of these steps 501-508 may be omitted.

Example Embodiment: Reviewing a Collection of Slides without AI

Figure 6:
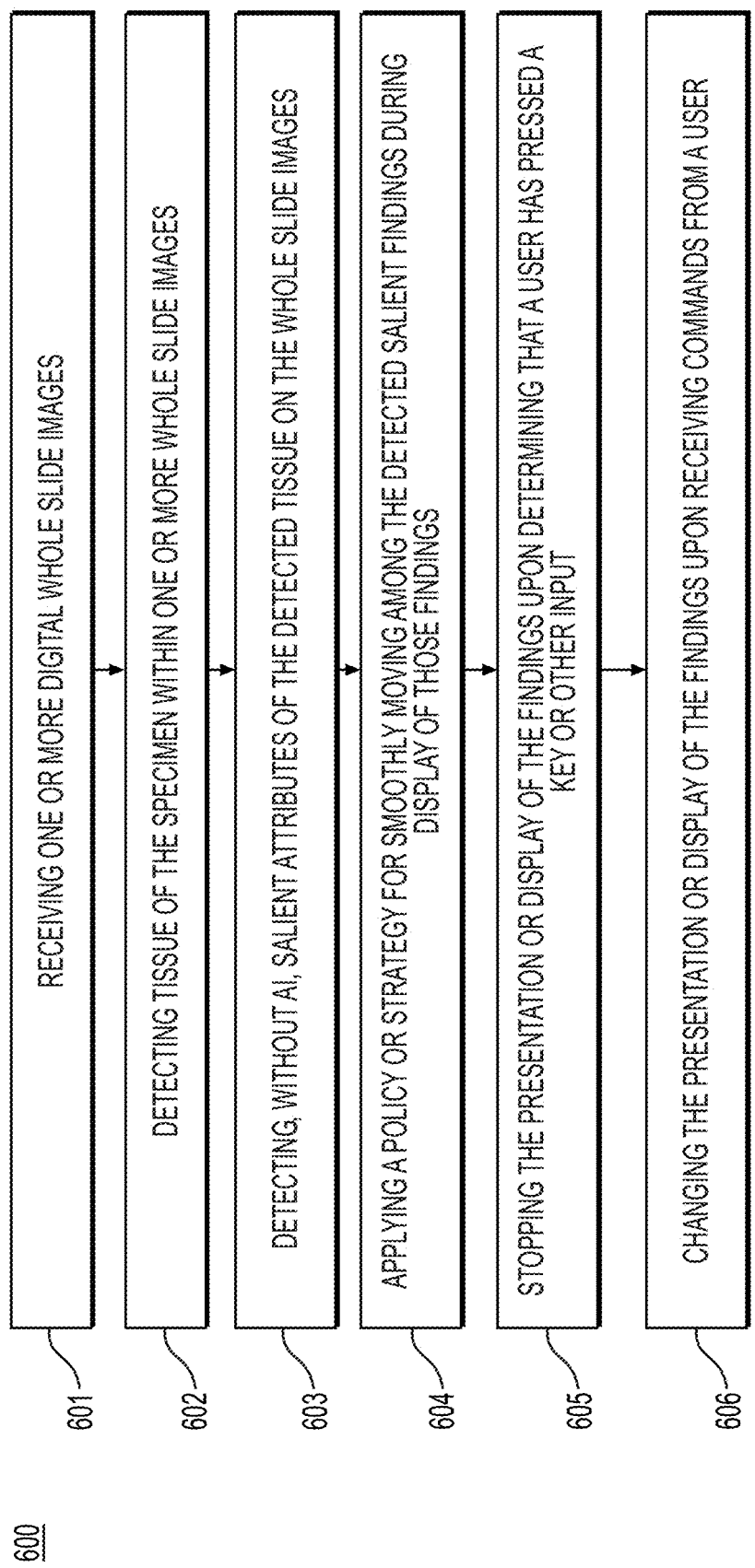
FIG. 6 is a flowchart illustrating an exemplary method for displaying salient attributes and reviewing a collection of slides without AI, according to an example embodiment.

FIG. 6 is a flowchart illustrating an exemplary method for displaying salient attributes and reviewing a collection of slides without AI, according to an example embodiment.

According to an example embodiment, techniques presented herein may be used without AI to alleviate fatigue. Although techniques without AI are less efficient than when an AI system is available, there are many cases where an AI is not available. For example, there may not be an AI system available for tissues that are rarely studied, e.g., tongue cancer. In applications where there is no AI system available, a user may annotate the slide. The user may create a set of annotations, define a zoom level for each, and/or create a priority order for the system to move from annotation to annotation. Other users who interact with the system and/or presentation may add, comment, or otherwise alter the collection of annotations, thereby changing the tissue hop, priority order, magnification level, etc. of the presentation.

For example, in breast cancer, if one user finds an area of ductal carcinoma in situ (DCIS), another user, having arrived at this section of DCIS by the tissue hop system may add a new point on the route where they noticed microinvasion within this DCIS. A user viewing this tissue hop later, if configured, may view the added annotation of this DCIS.

An exemplary method 600 may be performed by, e.g., the slide analysis tool 101 and/or the target image platform 135, but embodiments disclosed herein are not limited. Here, the exemplary method 600 may be similar to the exemplary method 400 described with reference to FIG. 4, but may differ in that detecting or identifying salient attributes of the detected tissue on the WSI may occur manually instead of with AI.

The method 600 may include, in step 601, receiving one or more digital whole slide images (WSIs) for at least a part of a specimen. The WSI may be received into electronic storage.

In step 602, the method 600 may include detecting tissue of the specimen within one or more WSIs. This step may include using a method (e.g., Otsu's method) to remove background from a thumbnail, threshold local regions within the WSI based on their variance to determine which do not have tissue, etc.

In step 603, the method 600 may include detecting or identifying, without AI, salient attributes of the detected tissue on the WSI. This detection may be performed manually, such as through manual annotations by a user.

In step 604, the method 600 may include following or applying a policy or strategy for smoothly moving (e.g., panning and zooming) among the detected salient findings during display of those findings (e.g., via output interface 138). Here, smoothly moving may include smoothly moving or panning across the tissue, excluding the background, and zooming in appropriately.

The policy or strategy may include appropriate or prescribed magnification levels based on the findings. The findings may be presented based on a descending order or priority determined by the policy or the user. This display or presentation, according to the policy or strategy, may present evidence to a user for an appropriate diagnosis of the tissue. Without using AI or manual annotations, the presentation may pan across all or multiple tissue areas. The presentation (i.e., presentation or priority order, magnification level, and/or tissue hop of the findings) may be stored and/or recorded for replay.

In step 605, during presenting or panning, the method 600 may optionally include stopping or pausing the presentation or display upon determining that a user has pressed a key or other input, e.g., a mouse stick or button, a joystick, or a keyboard button.

In step 606, the method 600 may optionally include receiving commands, comments, or annotations, and changing the presentation (e.g., presentation or priority order, magnification level, and/or tissue hop of the findings) based on the received commands. For example, a user may interact with a section of the tissue during hands-off or automatic panning of the tissue to comment or otherwise annotate. The user may change the presentation (e.g., presentation or priority order, magnification level, and/or tissue hop) by adding an annotation or rejecting an area that the AI system has identified or highlighted. Like the previous examples, one or more of these steps 601-606 may be omitted.

Example Embodiment: Prostate Needle Core Biopsies

Figure 7:
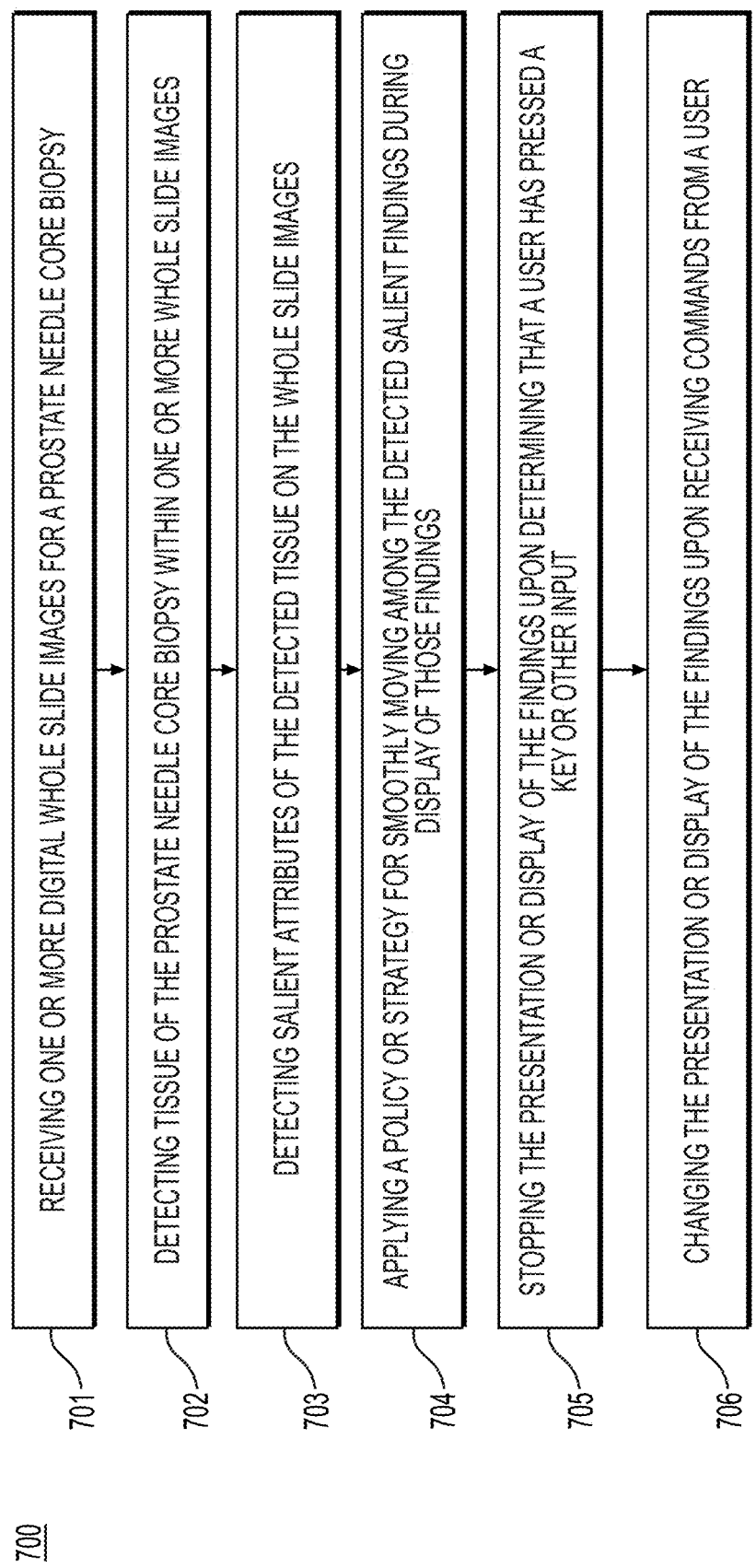
FIG. 7 is a flowchart illustrating an exemplary method for detecting salient attributes for a prostate tissue sample.

FIG. 7 is a flowchart illustrating an exemplary method for displaying salient attributes in the context of prostate needle core biopsies, according to an example embodiment.

Prostate needle core biopsies are some of the most common procedures performed each year. According to Johns Hopkins, more than one million prostate biopsy procedures are performed each year in the United States. According to an embodiment, efficiency may be increased in the evaluation of prostate need core biopsies.

At many institutions, more than one core is placed on a single slide. The user, in reviewing these slides for cancer, may need to review each core. Refer, for example, to FIG. 2. Techniques presented herein may pan the user along sections of the core that have been identified as carcinoma and upon completion of panning across one slide may seamlessly move to the next area of carcinoma ignoring the chasm of white space or glass between the two pieces of tissue. Upon competition of the cores on a single slide, the system may automatically move the user to the next slide to review the tumors, if any, that are present on additional slides.

The system may also be configured to take the user to the core with the most aggressive tumor first and preceded in descending order of invasion. These preferences may be configurable across institution and also across specimen type.

An exemplary method 700 may be performed by, e.g., the slide analysis tool 101 and/or the target image platform 135, but embodiments disclosed herein are not limited. Here, the exemplary method 700 may be similar to the exemplary method 400 described with reference to FIG. 4, but may exemplify how the method could be applied specifically to prostate needle core biopsies.

The method 700 may include, in step 701, receiving one or more digital whole slide images (WSIs) for a prostate needle core biopsy. The WSI may be received into electronic storage.

In step 702, the method 700 may include detecting tissue of the prostate needle core biopsy within one or more WSIs. This step may include using a method (e.g., Otsu's method) to remove background from a thumbnail, threshold local regions within the WSI based on their variance to determine which do not have tissue, etc.

In step 703, the method 700 may optionally include detecting or identifying salient attributes of the detected tissue on the WSI. This detection may be performed or assisted using AI or, alternatively or in addition thereto, manual annotations (e.g., by a user). Any AI may be performed with an already existing system (e.g., slide analysis tool 101 and/or salient region detection module 134).

In step 704, the method 700 may include following or applying a policy or strategy for smoothly moving (e.g., panning and zooming) among the detected salient findings during display of those findings (e.g., via output interface 138). The policy or strategy may include appropriate or prescribed magnification levels based on the findings. The findings may be presented based on a descending order or priority determined by the policy or the user. This display or presentation, according to the policy or strategy, may present evidence to a user for an appropriate diagnosis of the tissue. Without using AI or manual annotations, the presentation may pan across all or multiple tissue areas. The presentation (i.e., presentation or priority order, magnification level, and/or tissue hop of the findings) may be stored and/or recorded for replay.

In step 705, during presenting or panning, the method 700 may optionally include stopping or pausing the presentation or display upon determining that a user has pressed a key or other input, e.g., a mouse stick or button, a joystick, or a keyboard button.

In step 706, the method 700 may optionally include receiving commands, comments, or annotations, and changing the presentation (e.g., presentation or priority order, magnification level, and/or tissue hop of the findings) based on the received commands. For example, a user may interact with a section of the tissue during hands-off or automatic panning of the tissue to comment or otherwise annotate. The user may change the presentation (e.g., presentation or priority order, magnification level, and/or tissue hop) by adding an annotation or rejecting an area that the AI system has identified or highlighted. Like the previous examples, one or more of these steps 701-706 may be omitted.

Example Embodiment: Breast Excisions

Figure 8:
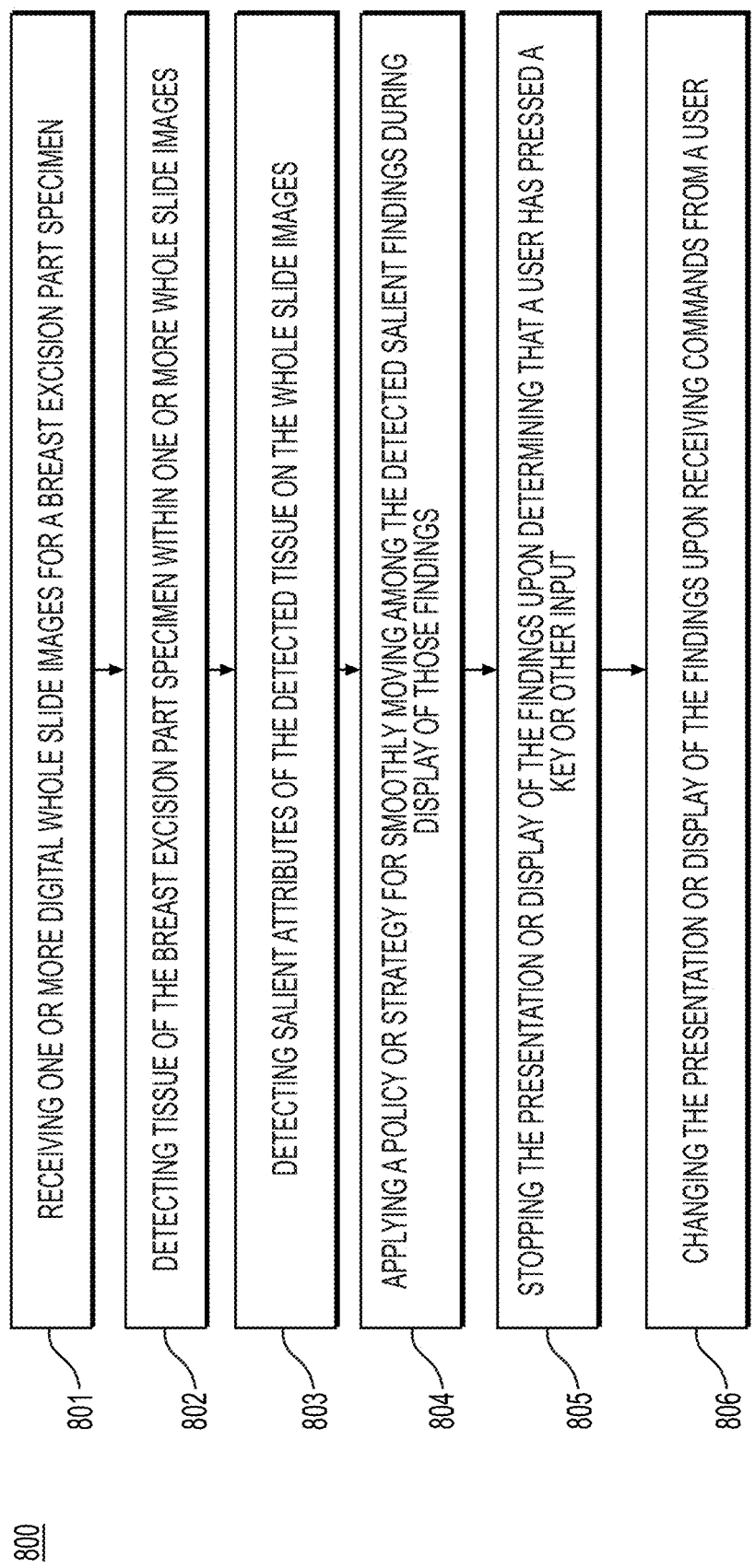
FIG. 8 is a flowchart illustrating an exemplary method for detecting salient attributes for a breast excision sample.

FIG. 8 is a flowchart illustrating an exemplary method for displaying salient attributes in the context of breast excisions, according to an example embodiment.

Breast excisions may be extremely large—at times over 100 slides. According to an embodiment, efficiency may be increased in the reporting of breast excisions.

After running an AI system to determine areas of interest across the breast excision, according to an embodiment, findings may be ordered across the slides so that the pathologists may seamlessly move from through the part to relevant slides. The system may smoothly pan to relevant findings across slides, rather than only panning across a single slide. For example, the system may first show invasive tumor across slides, followed by less relevant findings.

An exemplary method 800 may be performed by, e.g., the slide analysis tool 101 and/or the target image platform 135, but embodiments disclosed herein are not limited. Here, the exemplary method 800 may be similar to the exemplary method 400 described with reference to FIG. 4 and the exemplary method 700 described with reference to FIG. 7, but may exemplify how the method could be applied specifically to breast excisions.

The method 800 may include, in step 801, receiving one or more digital whole slide images (WSIs) for a breast excision part specimen. The WSI may be received into electronic storage.

In step 802, the method 800 may include detecting tissue of the breast excision part specimen within one or more WSIs. This step may include using a method (e.g., Otsu's method) to remove background from a thumbnail, threshold local regions within the WSI based on their variance to determine which do not have tissue, etc.

In step 803, the method 800 may optionally include detecting or identifying salient attributes of the detected tissue on the WSI. This detection may be performed or assisted using AI or, alternatively or in addition thereto, manual annotations (e.g., by a user). Any AI may be performed with an already existing system (e.g., slide analysis tool 101 and/or salient region detection module 134).

In step 804, the method 800 may include following or applying a policy or strategy for smoothly moving (e.g., panning and zooming) among the detected salient findings during display of those findings (e.g., via output interface 138). The policy or strategy may include appropriate or prescribed magnification levels based on the findings. The findings may be presented based on a descending order or priority determined by the policy or the user. This display or presentation, according to the policy or strategy, may present evidence to a user for an appropriate diagnosis of the tissue. Without using AI or manual annotations, the presentation may pan across all or multiple tissue areas. The presentation (i.e., presentation or priority order, magnification level, and/or tissue hop of the findings) may be stored and/or recorded for replay.

In step 805, during presenting or panning, the method 800 may optionally include stopping or pausing the presentation or display upon determining that a user has pressed a key or other input, e.g., a mouse stick or button, a joystick, or a keyboard button.

In step 806, the method 800 may optionally include receiving commands, comments, or annotations, and changing the presentation (e.g., presentation or priority order and magnification level of the findings) based on the received commands. For example, a user may interact with a section of the tissue during hands-off or automatic panning of the tissue to comment or otherwise annotate. The user may change the presentation (e.g., presentation or priority order, magnification level, and/or tissue hop) by adding an annotation or rejecting an area that the AI system has identified or highlighted. Like the previous examples, one or more of these steps 801-806 may be omitted.

Example Embodiment: Breast Biopsies

Figure 9:
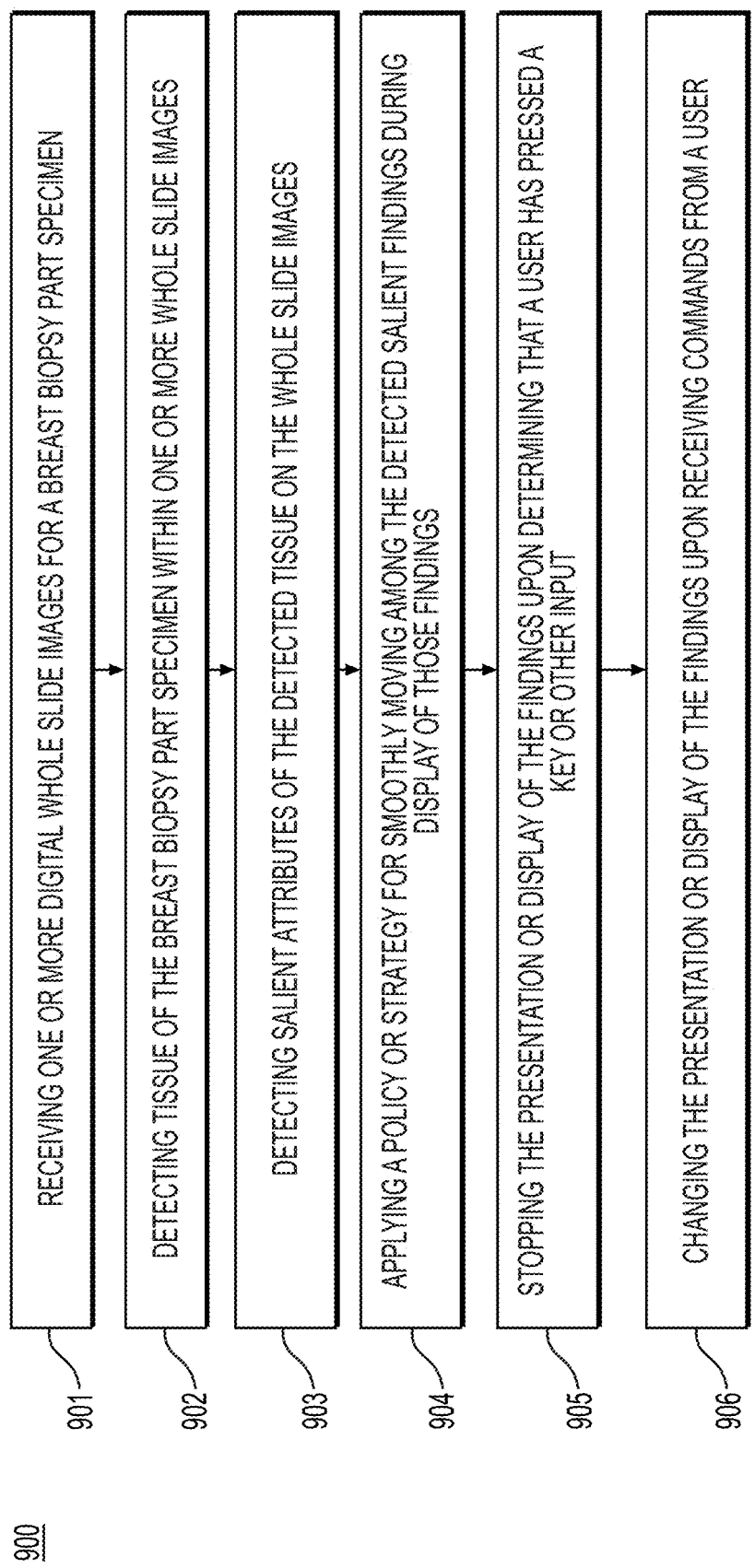
FIG. 9 is a flowchart illustrating an exemplary method for detecting salient attributes for a breast biopsy sample.

FIG. 9 is a flowchart illustrating an exemplary method for displaying salient attributes in the context of breast biopsies, according to an example embodiment.

Currently, pathologists reviewing breast biopsies often start with slide one and proceed through the slides provided looking for cancer or calcifications which are often signifiers or landmarks of cancer. Techniques presented herein may be used to smoothly pan among locations where cancer and calcifications are in close proximity for breast biopsies.

An exemplary method 900 may be performed by, e.g., the slide analysis tool 101 and/or the target image platform 135, but embodiments disclosed herein are not limited. Here, the exemplary method 900 may be similar to the exemplary methods 400, 700, and 800 described with reference to FIGS. 4, 7, and 8, respectively, but may exemplify how the method could be applied specifically to breast excisions.

The method 900 may include, in step 901, receiving one or more digital whole slide images (WSIs) for a breast biopsy part specimen. The WSI may be received into electronic storage.

In step 902, the method 900 may include detecting tissue of the breast biopsy part specimen within one or more WSIs. This step may include using a method (e.g., Otsu's method) to remove background from a thumbnail, threshold local regions within the WSI based on their variance to determine which do not have tissue, etc.

In step 903, the method 900 may optionally include detecting or identifying salient attributes (e.g., invasive breast cancer near calcifications) of the detected tissue on the WSI. This detection may be performed or assisted using AI or, alternatively or in addition thereto, manual annotations (e.g., by a user). Any AI may be performed with an already existing system (e.g., slide analysis tool 101).

In step 904, the method 900 may include following or applying a policy or strategy for smoothly moving (e.g., panning and zooming) among the detected salient findings during display of those findings (e.g., via output interface 138). The policy or strategy may include appropriate or prescribed magnification levels based on the findings. The findings may be presented based on a descending order or priority determined by the policy or the user. For example, identified invasive breast cancer near calcifications may be shown first, and these areas may be panned smoothly among the slides.

This display or presentation, according to the policy or strategy, may present evidence to a user for an appropriate diagnosis of the tissue. Without using AI or manual annotations, the presentation may pan across all or multiple tissue areas. The presentation (i.e., presentation or priority order, magnification level, and/or tissue hop of the findings) may be stored and/or recorded for replay.

In step 905, during presenting or panning, the method 900 may optionally include stopping or pausing the presentation or display upon determining that a user has pressed a key or other input, e.g., a mouse stick or button, a joystick, or a keyboard button.

In step 906, the method 900 may optionally include receiving commands, comments, or annotations, and changing the presentation (e.g., presentation or priority order, magnification level, and/or tissue hop of the findings) based on the received commands. For example, a user may interact with a section of the tissue during hands-off or automatic panning of the tissue to comment or otherwise annotate. The user may change the presentation (e.g., presentation or priority order, magnification level, and/or tissue hop) by adding an annotation or rejecting an area that the AI system has identified or highlighted. Like the previous methods, one or more of steps 901-906 may be omitted.

Techniques provided herein provide methods for smoothly panning across tissue with significantly less fatigue, which may be optimized using AI or human-provided annotations, with a policy (strategy) for the panning/zooming process.

Throughout this disclosure, references to components or modules generally refer to items that logically may be grouped together to perform a function or group of related functions. Like reference numerals are generally intended to refer to the same or similar components. Components and/or modules may be implemented in software, hardware, or a combination of software and/or hardware.

The tools, modules, and/or functions described above may be performed by one or more processors. "Storage" type media may include any or all of the tangible memory of the computers, processors or the like, or associated modules thereof, such as various semiconductor memories, tape drives, disk drives and the like, which may provide non-transitory storage at any time for software programming.

Software may be communicated through the Internet, a cloud service provider, or other telecommunication networks. For example, communications may enable loading software from one computer or processor into another. As used herein, unless restricted to non-transitory, tangible "storage" media, terms such as computer or machine "readable medium" refer to any medium that participates in providing instructions to a processor for execution.

The foregoing general description is exemplary and explanatory only, and not restrictive of the disclosure. Other embodiments of the invention may be apparent to those skilled in the art from consideration of the specification and practice of the invention disclosed herein. It is intended that the specification and examples be considered as exemplary only.

What is claimed is:

1. A computer-implemented method of identifying attributes of electronic images and displaying the attributes, the method comprising:
receiving one or more electronic medical images associated with a pathology specimen, the one or more electronic medical images including a first electronic medical image;
determining a plurality of salient regions within the one or more electronic medical images, the plurality of salient regions including a first salient region and a second salient region in the first electronic medical image;
determining a predetermined order of the plurality of salient regions, wherein the second salient region is after the first salient region according to the predetermined order;
determining, that the first salient region is equal to or greater than a predetermined distance from the second salient region; and
automatically panning, using a display, across the first salient region and across the second salient region according to the predetermined order.

2. The method of claim 1, further comprising:
detecting tissue within the one or more electronic medical images, wherein the plurality of salient regions comprise at least a portion of the detected tissue.

3. The method of claim 2, wherein detecting the tissue includes removing a background.

4. The method of claim 3, wherein removing the background includes thresholding a plurality of local regions within the one or more electronic medical images based on a variance of each local region among the plurality of local regions to determine which local regions among the plurality of local regions do not contain tissue.

5. The method of claim 1, wherein the predetermined order is determined according to a policy.

6. The method of claim 1, wherein the predetermined order is determined according to at least one of:
a tissue type;
a tissue texture;
a calcification presence or level;
an inflammation presence or level;
a salient region size;
a salient region shape;
a salient region location;
a disease type;
a color;
a stain type;
a tissue texture;
a biomarker type;
a genetic signature;
a protein type; and
one or more blood markers.

7. The method of claim 1, further comprising:
determining a magnification level of each salient region of the plurality of salient regions, wherein the automatically panning using the display is further according to the determined magnification level of each salient region.

8. The method of claim 7, wherein determining the magnification level of each salient region is based on a policy.

9. The method of claim 1, wherein the one or more electronic medical images includes a first electronic medical image and wherein the plurality of salient regions includes a first salient region in the first electronic medical image and a second salient region, the second salient region being after the first salient region according to the predetermined order, and wherein the method further comprises:
determining that the second salient region is in the first electronic medical image; and
automatically panning using the display, based on the determining, including panning across the first salient region to the second salient region in the first electronic medical image.

10. The method of claim 9, further comprising:
determining that the second salient region is not in the first electronic medical image;
determining that the second salient region is in a second electronic medical image; and
automatically panning using the display, including panning across the first salient region in the first electronic medical image, jumping to the second electronic medical image, and panning across the second salient region.

11. The method of claim 1, further comprising:
determining that a pause command has been received; and
pausing automatic panning of the display.

12. The method of claim 1, further comprising:
determining that an annotation has been received; and
automatically panning the display in accordance with the annotation.

13. The method of claim 1, further comprising:
determining the predetermined order based on a received annotation or policy, the received annotation or policy having been received prior to automatically panning.

14. The method of claim 1, further comprising:
during automatically panning, receiving at least one of an annotation or a policy; and
modifying the predetermined order based on the received annotation or policy.

15. The method of claim 1, wherein the one or more electronic medical images are whole slide images obtained using a microscope.

16. A system for identifying attributes of electronic images and displaying the attributes, the system comprising:
at least one memory storing instructions; and
at least one processor configured to execute the instructions to perform operations comprising:
receiving one or more electronic medical images associated with a pathology specimen, the one or more electronic medical images including a first electronic medical image;
determining a plurality of salient regions within the one or more electronic medical images, the plurality of salient regions including a first salient region and a second salient region in the first electronic medical image;
determining a predetermined order of the plurality of salient regions, wherein the second salient region is after the first salient region according to the predetermined order;
determining, that the first salient region is equal to or greater than a predetermined distance from the second salient region; and
automatically panning, using a display, across the first salient region and across the second salient region according to the predetermined order.

17. The system of claim 16, wherein the operations further comprise:
determining a magnification level of each salient region of the plurality of salient regions, wherein the automatically panning using the display is further according to the determined magnification level of each salient region.

18. The system of claim 16, wherein, upon receiving an annotation or a policy, the processor is configured to modify the instructions.

19. A non-transitory computer-readable medium storing instructions that, when executed by a processor, perform a method for identifying attributes of electronic images and displaying the attributes, the method comprising:

receiving one or more electronic medical images associated with a pathology specimen, the one or more electronic medical images including a first electronic medical image;

determining a plurality of salient regions within the one or more electronic medical images, the plurality of salient regions including a first salient region and a second salient region in the first electronic medical image;

determining a predetermined order of the plurality of salient regions, wherein the second salient region is after the first salient region according to the predetermined order;

determining, that the first salient region is equal to or greater than a predetermined distance from the second salient region; and automatically panning, using a display, across the first salient region and across the second salient region according to the predetermined order.

* * * * *